March 14, 1939.  J. Q. COPE  2,150,491
LIQUID DISTRIBUTOR
Filed Oct. 26, 1935

Inventor
JOHN Q. COPE
by *J. Adams*
Attorney

Patented Mar. 14, 1939

2,150,491

UNITED STATES PATENT OFFICE 2,150,491

LIQUID DISTRIBUTOR

John Q. Cope, Berkeley, Calif., assignor to Standard Oil Company of California, San Francisco, Calif., a corporation of Delaware Application October 26, 1935, Serial No. 46,923

1 Claim. (Cl. 23—270)

This invention relates to a method and means for the distribution and mixing of liquids, such as in treating a hydrocarbon oil with a selective solvent to purify the same, and particularly refers to the mixing or rather intimately contacting of liquids which are not completely miscible and which, after the desired contact and reaction has been completed, are to be separated, as by a gravity action, into two or more definite and continuous phases.

In certain types of liquid phase treaters, and particularly those of the continuous counterflow type the two liquids to be contacted are separately introduced into a vessel which may be open or filled with a suitable packing material. In order to obtain the maximum degree of contact, the heavier liquid is injected, usually by a plurality of jets, into the upper portion of the vessel, and the lighter liquid is similarly injected into the lower portion of the vessel. Due to the separating effect of gravity, and by proper regulation of flow and withdrawal of the liquids, the lighter liquid rises to the upper portion of the vessel and forms a continuous phase therein, and the heavier liquid similarly forms a continuous phase in the lower part of the vessel. Thus the two liquids are injected each into a continuous phase of the other and in this manner, by uniform distribution and injection at a great number of points over the area of the vessel, the maximum degree of liquid contact is obtained. Because of the separation mentioned, the lighter liquid may be continuously withdrawn at the top of the vessel from above the point of injection of the heavier liquid and the heavier liquid continuously withdrawn from the bottom of the vessel below the point of injection of the lighter liquid. Reaction products of the contact between the respective liquids will ordinarily mix with and pass out with one or the other major components, depending upon the respective densities of the various liquids concerned.

The problem of obtaining a uniform distribution of the injected liquid into the continuous phase of the other liquid, in this example, is through the medium of an interlaced grid of parallel pipes provided with orifices or jets. In order to attain the most uniform distribution, it has been found that the pressure drop along the individual pipes of these grids must be very low, so they are made relatively large in diameter. The jets or orifices, however, should be made relatively small in diameter, to have a high pressure drop thereacross as compared to the pressure drop in the pipe grids. This high pressure drop unavoidably results in a high outlet velocity of the liquid being injected, due to the high kinetic energy of the rapidly moving jet.

Under some circumstances, as for example, the treatment of a hydrocarbon oil with certain selective solvents, it is very desirable that high velocities of one liquid into the other be avoided, due to the possible formation of emulsions that are very difficult to separate and to undesirable agitation of the continuous phase liquid. This invention contemplates a method and means for permitting these high liquid velocities through the nozzles or jets, and provides for their subsequent damping or absorption in a relatively quiescent body of the same liquid, followed by a gentle or smooth release of the injected liquid into the continuous phase liquid being treated at a great number of points. This permits the uniform liquid distribution that is required, and at the same time avoids the formation of emulsions and undue agitation of the liquid.

Thus it is an object of this invention to provide a method and means for injecting and distributing a liquid into a continuous phase of another liquid, as in a continuous counterflow treater, at a number of points, in a uniform manner, and without high velocities of one liquid into another.

Another object is to provide a means for absorbing the kinetic energy of a liquid jet which is directed into a second liquid whereby excessive relative velocities are avoided, as well as undesirable agitation of the said second liquid.

Another object is to provide a method and means for injecting and distributing a liquid into a second liquid in a continuous counterflow treater at low velocity whereby the formation of unnecessarily small droplets is prevented, and carry-over of the injected liquid with the continuous phase liquid is reduced.

Another object is to provide a method and means for avoiding the formation of emulsions due to the injection of a liquid into another liquid at high velocity.

These and other objects and advantages will be more fully apparent from the following description and from the accompanying drawing, which forms a part of this specification and illustrates a preferred embodiment of this invention.

Figure 1:
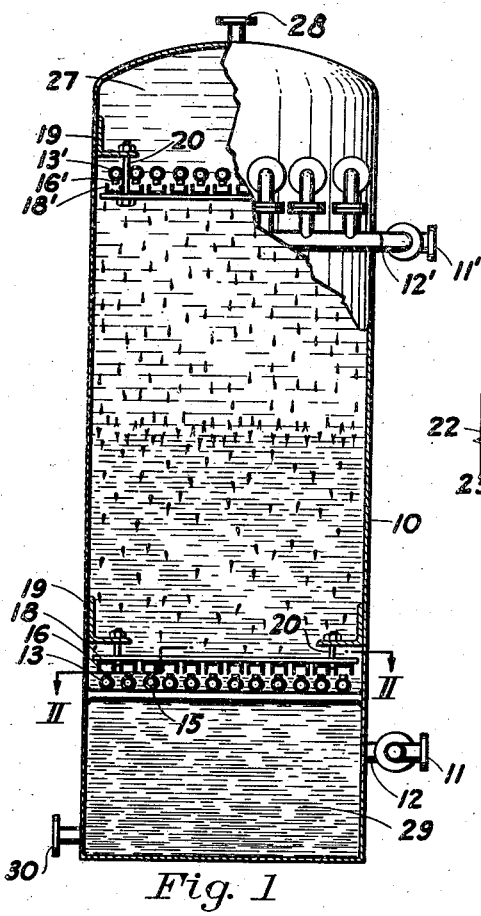
Figure 1 is a vertical sectional view through a continuous counterflow treater to which this invention has been applied.
Figure 2:
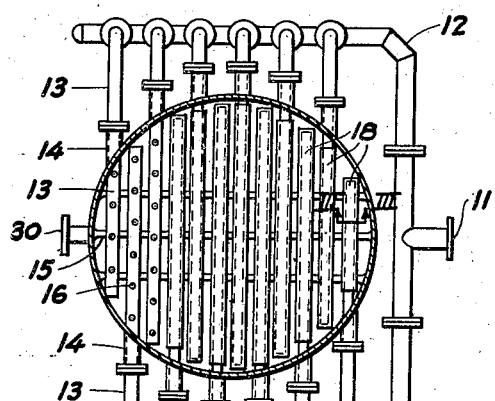
Figure 2 is a horizontal section view on line II—II of the treater shown in Figure 1, illustrating a pipe grid distributor and channel type velocity absorbers thereabove.

Referring to the drawing, and particularly to Figures 1 and 2, the treater of this example is designated by the reference number 10 and is provided with a light liquid inlet 11 which leads through branches 12 to the distributor pipe grid sections 13. These latter are preferably of relatively large diameter and arranged with flanged sleeves 14 so as to be readily removable from the treater shell 10, and are supported on horizontal members 15 to be at substantially the same level.

Figure 3:
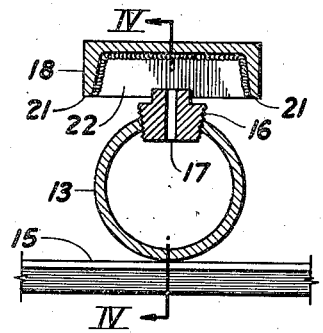
Figure 3 is a vertical sectional view on line III—III of Figure 2 showing a nozzle and a trough arrangement for the jet therefrom, to an enlarged scale.

Each of the distributor pipe sections 13 is fitted with a plurality of upwardly directed nozzles 16 (Figures 3 and 4) which may be conventional pipe plugs, each with a small drilled orifice or passage 17. Directly over and coaxial with each pipe section 13 is mounted a channel or trough 18, concave toward nozzles 16, and preferably adjustably supported as by brackets 19 and bolts 20. The lower edges 21 of trough 18 are preferably at or slightly below the level of the extremity of nozzles 16, so that the high velocity jet of light liquid emerging from the bore 17 will fill up the channel 18 to form a pool of light liquid, in which the kinetic energy of the jet will be expended without agitating the heavy liquid surrounding the distributor system. Thereafter the light liquid will flow gently around and upwardly from the edges 21 into the surrounding heavy liquid (Figure 1). To facilitate equal distribution in case the edges 21 of trough 18 are not truly level, partitions 22 are preferably placed in the trough between the respective nozzles 16, thus providing individual compartments or cups from which the light liquid may flow into the heavy liquid surrounding the distributor.

Figure 4:
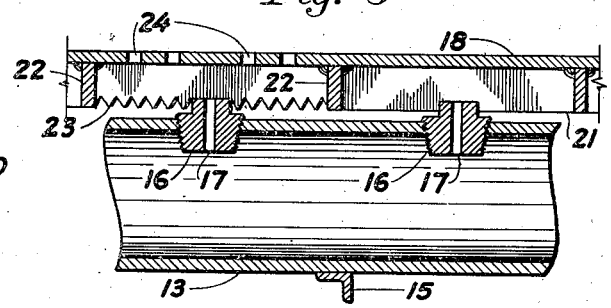
Figure 4 is a vertical sectional view on line IV—IV of Figure 3, and illustrates alternative arrangements of the distributing trough or receiver for the jets.

An optional modification of the structure just described is also illustrated in Figure 4 and consists in providing the edges 21 of the channel 18 with serrations or notches 23, and, if desired, perforations 24, in the horizontal portion of the channel 18, to increase the length of the extended releasing edge for the liquid and insure its being broken up into small streams or droplets.

Figure 5:
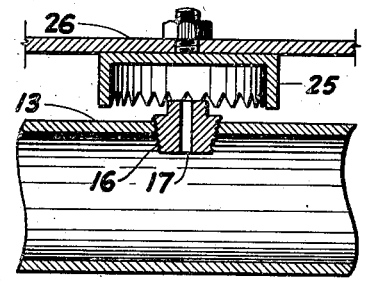
Figure 5 is a vertical sectional view similar to Figure 4, showing another alternative arrangement of the jet receiver in the form of a cap for each nozzle.

A second modification of the structures just described is illustrated in Figure 5, and consists in the provision of an individual cap or cup 25, suitably supported by a member 26, for each nozzle 16, which, under certain circumstances, might be more economical or desirable than the channel or trough arrangement 18.

The essential requirement of the various alternatives described is the provision of concave means, such as a cup or receptacle, adapted to receive the high velocity jet of liquid from the injection nozzle and also arranged to trap or hold a quantity of the said liquid substantially out of mixing or agitating contact with the surrounding liquid in the treater, to form a turbulence chamber for a damping body of the first named liquid in which the kinetic energy of the high velocity jet may be absorbed. The concave cup or receptacle is also positioned and arranged so that the first liquid may flow gently and uniformly therefrom into the surrounding liquid to contact the same.

The arrangement of distributor means for the heavy liquid inlet 11' and branches 12', as shown in the upper portion of Figure 1, is essentially the same as that just described for the light liquid inlet. Inasmuch as the heavy liquid is injected into a continuous phase of a lighter liquid and travels downwardly therethrough under the action of gravity as a number of small streams or droplets, it will be appreciated that the nozzles 16' therefor are directed downwardly and the channels 18' or equivalent structure forming the cups or receptacles into which the nozzles discharge, are below the distributor pipes 13' and are arranged to be concave upwardly. Thus the heavy liquid issues at a high velocity through the nozzles 16' and accumulates in the concave receptacles of channels 18', where the high kinetic energy is absorbed, and thereafter flows gently downwardly over the edges 21' of the receptacles into the surrounding lighter liquid.

In the example disclosed, the light liquid rises to the top of shell 10 through the separating space 27 to outlet 28 and may be withdrawn therefrom. Likewise, the heavy liquid falls through the separating space 29 to outlet 30 and may be withdrawn therethrough. Reaction products of the contact between the respective liquids will ordinarily mix with and pass out with one or the other, depending on the respective density of the final products of the treatment carried out in the vessel 10.

Thus the objects outlined are obtained, in the example illustrated, by an interlaced grid of fairly large pipe, with small nozzles, to give a high pressure drop through the latter as compared to the former, thereby obtaining uniform distribution. The high velocity of the injected liquid resulting from the small nozzles is absorbed in the bodies of the same liquid trapped in the concave members, from which that liquid is released into the continuous phase liquid with a minimum agitation of the latter.

Although a specific example embodying this invention has been described and illustrated, it is to be understood that the invention is not limited to that particular form or environment, and all such modifications and changes as come within the scope of the following claim are embraced thereby.

I claim:

A distributor system for introducing two dissimilar liquids into a vertically elongated vessel having liquid outlets at the top and bottom thereof, to promote intimate contact with liquid therein without channeling or turbulence, comprising an upper liquid piping for introducing a heavier liquid into said vessel, spaced downwardly directed nozzles in said upper piping, a plurality of upwardly concave receptacles aligned with and below said nozzles, a lower liquid piping for introducing a lighter liquid into said vessel, spaced upwardly directed nozzles in said lower piping, and a plurality of downwardly concave receptacles aligned with and above said nozzles, the overflow from said receptacles into which said liquids are jetted respectively descending and ascending freely through a considerable distance and in undisturbed liquid to the respective outlets of said vessel without contacting intermediate members therein.

JOHN Q. COPE.